No. 748,878. PATENTED JAN. 5, 1904.
T. D. OWENS, Jr.
SCOOP.
APPLICATION FILED JAN. 19, 1903.
NO MODEL.

Witnesses:
H. McFarland
J. L. Trefacur Jr.

Inventor:
Thomas D. Owens, Jr.
By J. M. Cooke,
Attorney

No. 748,878. Patented January 5, 1904.

UNITED STATES PATENT OFFICE.

THOMAS D. OWENS, JR., OF PITTSBURG, PENNSYLVANIA.

SCOOP.

SPECIFICATION forming part of Letters Patent No. 748,878, dated January 5, 1904.

Application filed January 19, 1903. Serial No. 139,562. (No model.)

*To all whom it may concern:*

Be it known that I, THOMAS D. OWENS, Jr., a resident of Pittsburg, in the county of Allegheny and State of Pennsylvania, have invented a new and useful Improvement in Scoops; and I do hereby declare the following to be a full, clear, and exact description thereof.

My invention relates to scoops, and has special relation to what are known as "weighing-scoops" for weighing materials therein without being compelled to weigh the said materials on a separate scale.

The object of my invention is to provide such a form of a weighing-scoop which will be cheap and simple in its construction and operation, as well as one in which the materials will be weighed by the expansion of the spring forming part of the scale.

A further object is to provide such a weighing-scoop in which the scoop proper will be prevented from turning during the holding or weighing of the materials therein and one in which means shall be provided for locking or holding said scoop rigid during the inserting of the materials therein and such means also acting to indicate the amount of materials within said scoop.

My invention consists, generally stated, in the novel arrangement, construction, and combination of parts, as hereinafter more specifically set forth and described, and particularly pointed out in the claims.

To enable others skilled in the art to which my invention appertains to construct and use my improved weighing-scoop, I will describe the same more fully, referring to the accompanying drawings, in which—

Figure 1:
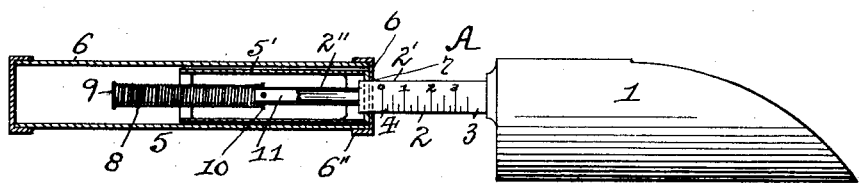
Figure 2:
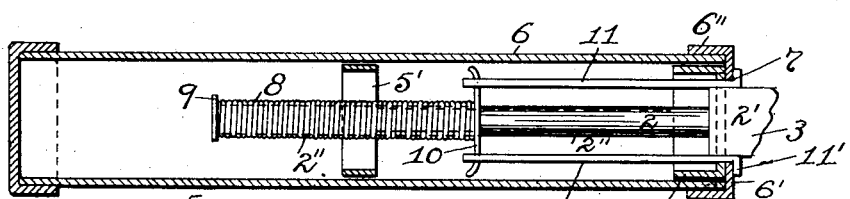
Figure 3:
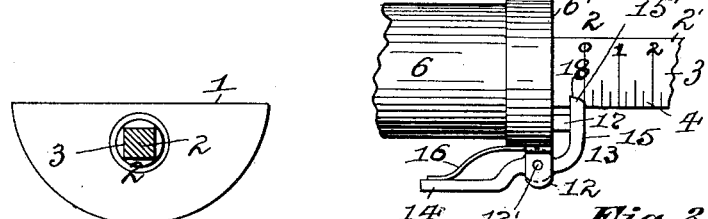
Figure 4:
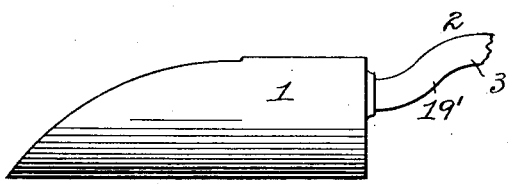
Figure 5:
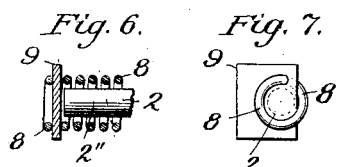
Figures 6, 7, 8:
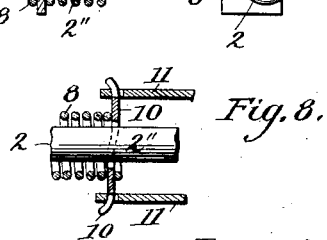

Figure 1 is a side view, partly in section, of my improved weighing-scoop. Fig. 2 is an enlarged sectional view of the handle or casing at right angles to that shown in Fig. 1 and having some of the parts in full lines. Fig. 3 is an enlarged detail view showing the combined locking device and pointer or indicator. Fig. 4 is a cross-section on the line *x x*, Fig. 1, looking in the direction of the arrow. Fig. 5 is a side view of the scoop, showing another form of the bar or shaft; and Figs. 6, 7, and 8 are enlarged detail views of the spring connections.

Like symbols of reference herein indicate like parts in each of the figures of the drawings.

As illustrated in the drawings, A is the weighing-scoop scale, in which 1 represents the scoop, and 2 the weighing or scale shaft, which is rigidly attached to or formed as part of the said scoop 1, and such scale-shaft 2 is formed square in cross-section for a portion of its length, as at 2', so as to provide for the flat sides 3 thereon. The portion 2' of the scale-shaft 2 is provided with the marks 4 thereon to represent the different measurements of weight, and beyond this portion 2' is the rounded or circular portion 2" of said shaft. The scale-shaft 2 is adapted to be moved and carried within a handle 5, formed of a casing 6, and such shaft 2 is supported within said handle 5 by the flat portion 2' of said shaft 2, fitting within and passing through an opening 7 of like shape as the portion 2' in the end 6' of the casing 6, forming the handle 5. A spiral spring 8 is placed around the scale-shaft 2, and such spring 8 is rigidly connected by soldering at one end to a plate 9 at the end of the circular portion 2" of said shaft 2 which passes through said spring 9, while the opposite end of said spring is rigidly connected by soldering to a plate 10, which passes through said spring and fits loosely around the circular portion 2" of said shaft 2. Rods or bars 11 are connected to this plate 10, which bars 11 are adapted to extend alongside of the flat portion 2' of the shaft 2 and are connected to the end 6' of the handle 5 by the bent flanges 11' thereon. The end 6' of the handle 5 can be provided with the annular flange 6" thereon for fitting over the end of the casing 6, so as to allow for the casing 6 to be removed for any purpose desired, in which case the said casing can be supported upon a skeleton frame 5', which extends around the scale-shaft 2 within the casing 6 and is held in place by the end 6'.

Pivoted at 12' on the lug 12, extending out from the flange 6" on the end 6', is the combined pointer and locking-lever 13, which is provided with the handle 14 at one end and the pointer or dog 15 at the other end thereof. A flat leaf-spring 16 is held by said lug 12 at one end, and its opposite end is adapted to bear against the handle 14, while the dog 15 is held in position by the stop 17 on the end 6', and its rounded end 15' is adapted to fit or engage with a notch or seat 18, formed in one of the flat sides 3 on the portion 2' of the scale-shaft 2.

For the use and operation of my improved weighing-scoop all that is required is for the manipulator to grasp the handle 5 of the weighing-scoop scale A as he would the ordinary manner of an ordinary scoop and with the pointer and locking-lever 13 in the position shown in Fig. 3 as being locked by the dog 15 engaging the seat 18 in the scale-shaft 2, and such manipulator lifts within the scoop 1 those materials, ingredients, &c., which are desired to be weighed. After this is done the manipulator simply raises the weighing-scoop scale A to a position vertical, and by pressing on the handle 14 of the lever 13 the handle 14 of the lever 13 will compress the spring 16, which releases the seat 18 in the scale-shaft 2 from the dog 15 on said lever 13 and allows said shaft 2 to immediately travel within the handle 5 through the opening 7 in the end 6' thereof. As the scale-shaft 2 thus travels within the handle 5 the spiral spring 8, connected to the plate 9 and to the end 6' by the plate 10 and bars 11, will be expanded by the end of said shaft 2 engaging the plate 9, so that the contents of the scoop will be weighed thereby, and the amount contained within the scoop 1 will be indicated by the end 15' of the dog 15 coming opposite the marks 4 on the portion 2' of the shaft 2 as such end 15' travels along the flat side 3 of said portion 2', containing the seat 18 for the dog 15. After the contents of the scoop 1 have been thus measured and weighed such contents can be expelled or dumped from the scoop 1 in the ordinary manner, which will allow the spring to be retracted to its normal position, as shown in Fig. 1, and cause the scale-shaft 2, carrying the scoop 1, to be moved out of the handle 5, while during such outward movement of the shaft 2 the dog 15 will slide along the flat side 3 of the portion 2' on said shaft until the seat 18 reaches the end 15' on the dog 15, when said end 15' will be forced into said seat 18 by the releasing of the pressure upon the spring 16 and such shaft 2 will be locked ready for another use and operation.

If desired, the scale-shaft 2 can be bent or turned, as at 19' in Fig. 4, in order that the scoop 1 will not be in the same vertical line with said shaft 2 during the measuring and weighing of the contents of said scoop 1, and thereby overcoming any possibility of such contents dropping out of said scoop during such measuring and weighing. This and various other modifications and changes in the construction and design of the various parts of my improved weighing-scale scoop may be resorted to without departing from the spirit of the invention or sacrificing any of its advantages.

It will thus be seen that my improved weighing-scale scoop will operate quickly in use and the contents of the scoop will not be liable to be expelled or dumped out by the turning of the scale-shaft and that friction on such shaft will be reduced to a minimum by its construction and design. It will further be evident that in the operation of the scale-spring in expanding during the weighing of the contents of the scoop will prevent the spring from becoming weak, thereby increasing the life of the same and accuracy in measuring and weighing.

What I claim as my invention, and desire to secure by Letters Patent, is—

1. A combined scoop and scale, comprising a scoop having a scale-shaft thereon, a handle, and a spiral spring passing around said shaft and connected to said handle, said spring being operatively connected to the end face of said shaft so as to be expanded by such end face in measuring and weighing the contents of the scoop.

2. A combined scoop and scale, comprising a scoop having a scale-shaft thereon, a handle, a spiral spring within said handle and passing around said shaft, and connections between said spring and handle, said spring being operatively connected to the end face of said shaft so as to be expanded by such end face in measuring and weighing the contents of the scoop.

3. A combined scoop and scale, comprising a scoop having a scale-shaft thereon, a handle, a spiral spring within said handle and connected to and passing around said shaft, and bars connected to said spring and handle whereby said spring will be expanded in measuring and weighing the contents of the scoop.

4. A combined scoop and scale, comprising a scoop having a scale-shaft thereon, a handle, a spiral spring within said handle, a plate connecting said shaft and spring, and bars connecting said handle and a plate on said spring, whereby said spring will be expanded in measuring and weighing the contents of the scoop.

5. A combined scoop and scale, comprising a scoop, a scale-shaft on said scoop having graduated scale-marks thereon, a handle, a spring-operated lever pivoted to said handle, and a projection or dog on said lever adapted to engage with a seat in the scale-shaft for locking said shaft and to indicate by said marks the amount contained in said scoop to be weighed.

6. A combined scoop and scale, comprising a scoop, a scale-shaft on said scoop having graduated scale-marks thereon, a handle, a spring-operated lever pivoted to said handle, and a projection or dog on said lever adapted to engage with a seat in the scale-shaft immediately below the zero-point of said scale-marks for locking said shaft and to indicate by said marks the amount contained in said scoop to be weighed.

7. A combined scoop and scale, comprising a scoop having a scale-shaft, a handle, a spiral spring passing around said shaft and connected to said shaft and handle, and a plate on the said spring adapted to be engaged by said shaft whereby said spring will be expanded in measuring and weighing the contents of the scoop.

8. A combined scoop and scale, comprising a scoop having a scale-shaft, a handle, a spiral spring passing around said shaft and connected to said shaft and handle, and a plate connected to the end of said spring and through the same, said plate being adapted to be engaged by said shaft whereby said spring will be expanded in measuring and weighing the contents of the scoop.

9. A combined scoop and scale, comprising a scoop having a scale-shaft thereon, a handle, a spiral spring within said handle and connected to and passing around said shaft, a plate connected to said spring, and bars connected to said handle and plate whereby said spring will be expanded in measuring and weighing the contents of the scoop.

10. A combined scoop and scale, comprising a scoop having a scale-shaft thereon, a handle, a spiral spring within said handle and connected to and passing around said shaft, a plate passing around said shaft and through said spring, and bars connected to handle and plate whereby said spring will be expanded in measuring and weighing the contents of the scoop.

In testimony whereof I, the said THOMAS D. OWENS, Jr., have hereunto set my hand.

THOMAS D. OWENS, JR.

Witnesses:
  J. N. COOKE,
  J. L. TREFALLER, Jr.